Aug. 10, 1937.   F. L. CORBIN   2,089,878
SHIP'S INDICATING SYSTEM
Filed June 23, 1933   3 Sheets-Sheet 1

WITNESSES
John R. Cole
Bernard H. Luerssen

INVENTOR
Francis L. Corbin

Aug. 10, 1937.   F. L. CORBIN   2,089,878
SHIP'S INDICATING SYSTEM
Filed June 23, 1933   3 Sheets-Sheet 2

WITNESSES
John R. Cole
Bernard H. Iversen

INVENTOR
Francis L. Corbin.

Aug. 10, 1937.   F. L. CORBIN   2,089,878

SHIP'S INDICATING SYSTEM

Filed June 23, 1933   3 Sheets-Sheet 3

WITNESSES
John R. Cole
Bernard H. Luersen

INVENTOR
Francis L. Corbin.

Patented Aug. 10, 1937

2,089,878

UNITED STATES PATENT OFFICE 2,089,878

SHIP'S INDICATING SYSTEM

Francis L. Corbin, Chatham, N. J., assignor to Pitometer Log Corporation, New York, N. Y.

Application June 23, 1933, Serial No. 677,276

6 Claims. (Cl. 264—9)

My invention relates to the operation of steamships or other vessels driven by means of internal prime movers, and has for its purpose the providing of information for the ship's navigators as to the speed of the ship's engines.

I am aware that schemes have heretofore been devised for giving some information as to the ship's engine performance but these attempts have been incomplete, inaccurate, inconvenient or otherwise insufficient, while my system meets the requirements to a much higher degree. I wish to claim those novel features whereby I obtain the improved results.

In my system I provide an accurate and rugged indicator for showing the speed of the propeller, continuously, and by a single pointer and dial, the reading on the dial following the momentary speed variations, this indicator being thus contrasted with those heretofore used, in which the shaft revolutions are actually summated on a counter for a length of time and the total registered and left unchanged for the time being as an indication of the speed of the vessel, while a second pointer is being put through the revolution counting cycle to give a second fixed indication to be used until a fresh indication can be built up on the first indicator, and so on.

Figure 4A:
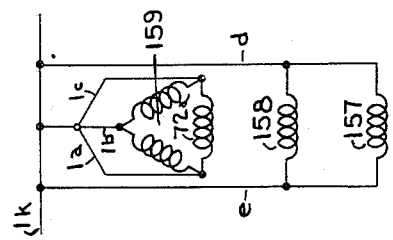
Figure 4:
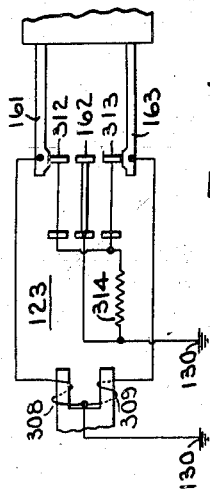
Figure 4B:
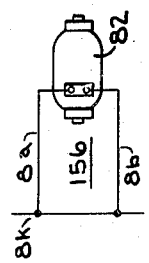
Figure 1:
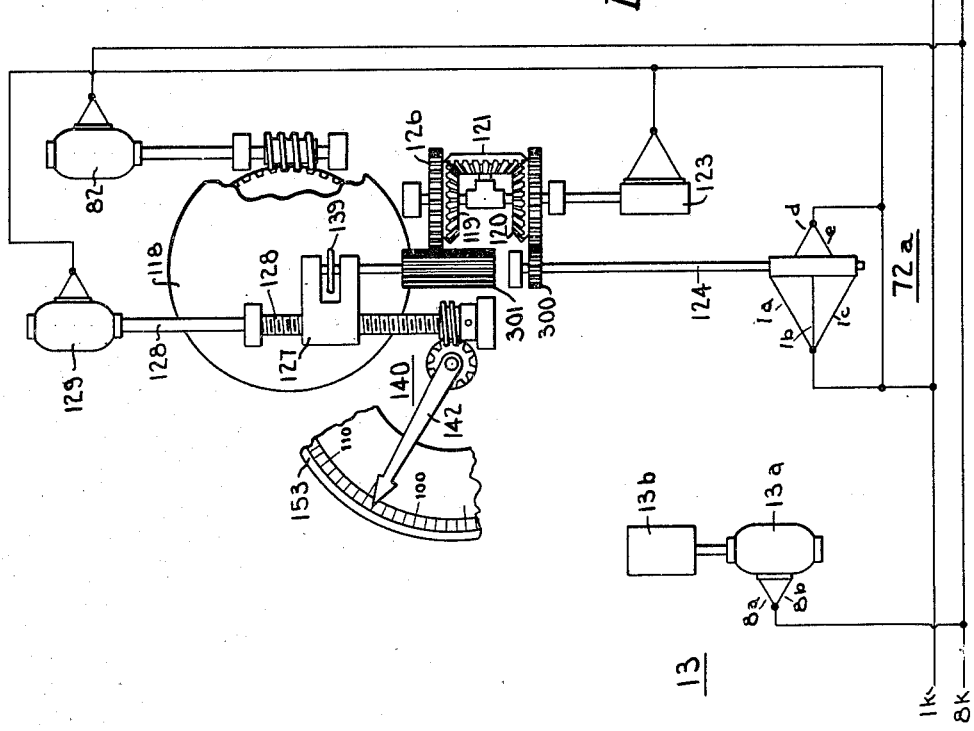
Figure 3:
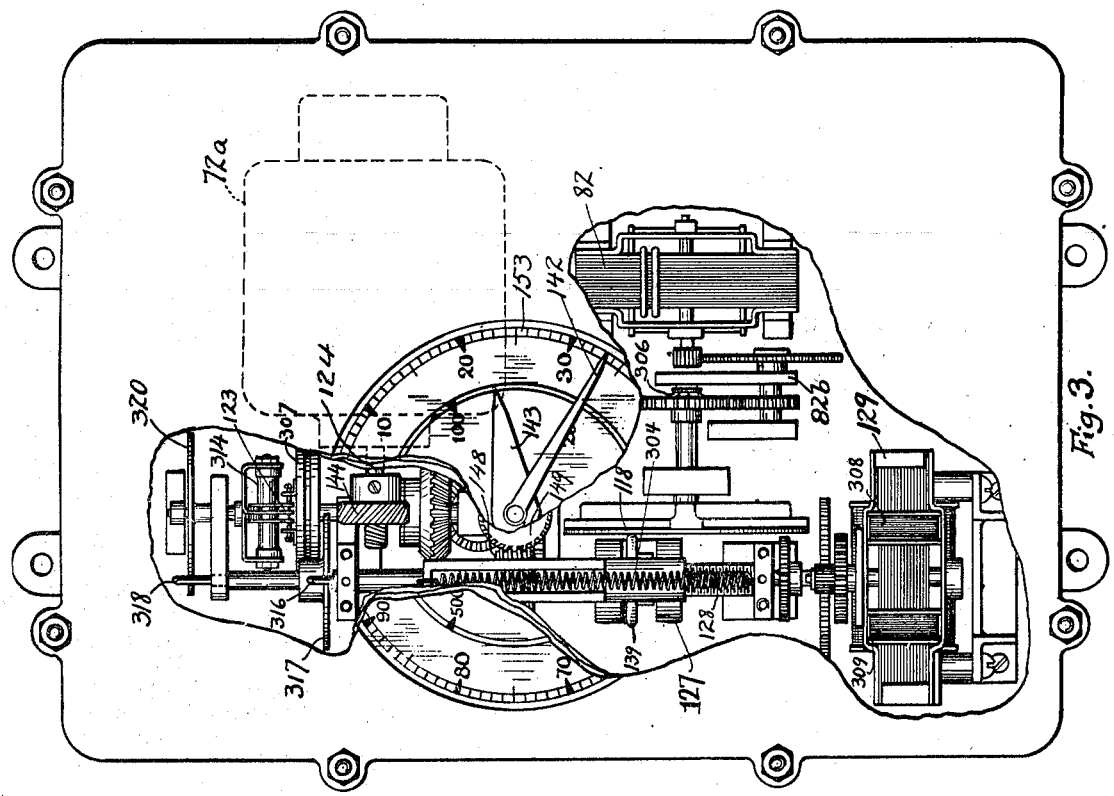
Figure 2:
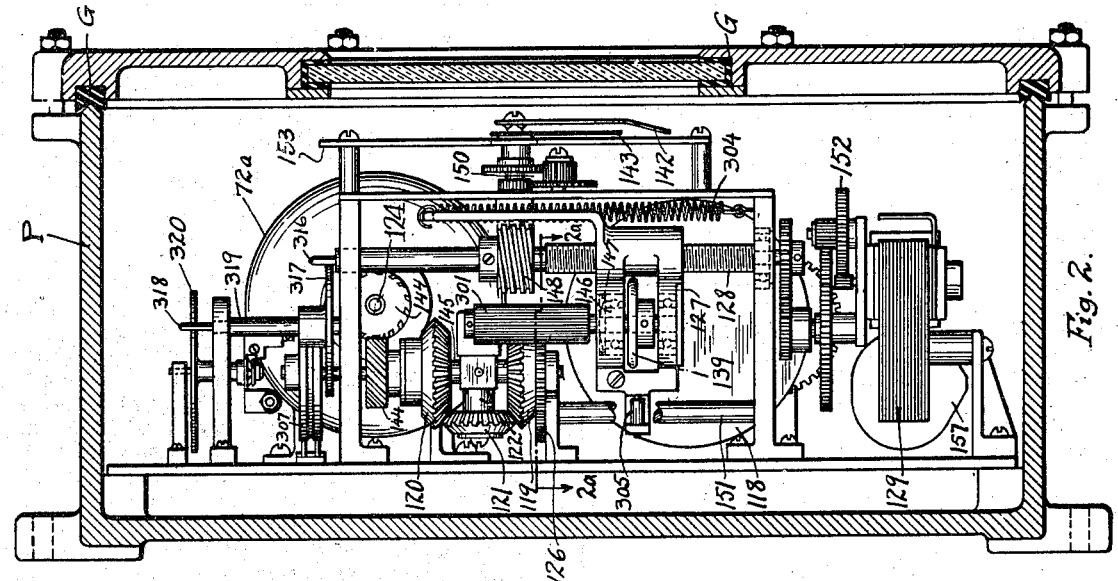
Figure 7:
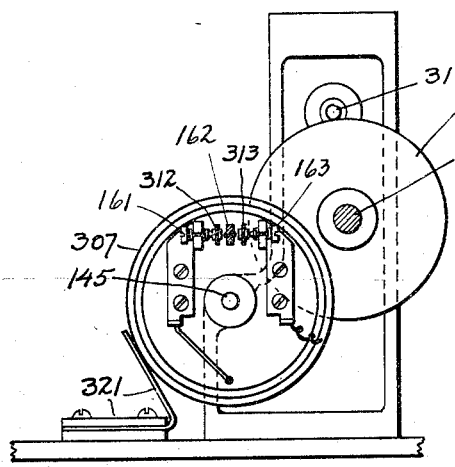
Figure 6:
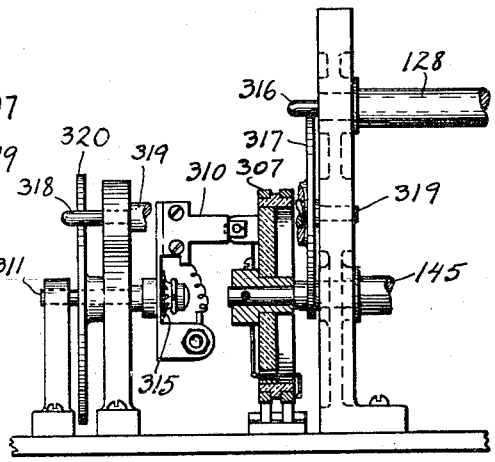
Figure 2A:
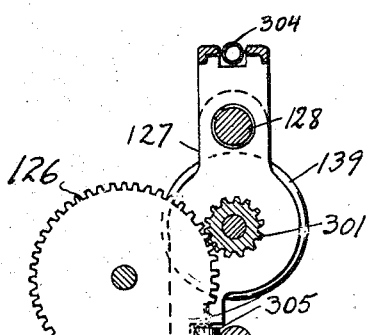
Figure 5:
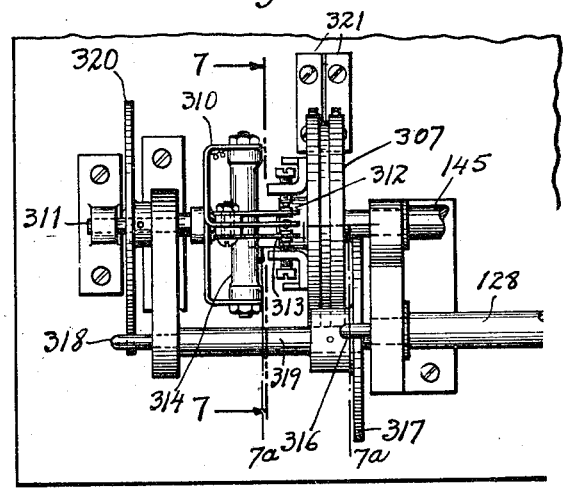

My system includes some important novel constructions, such as the indicating mechanism. I may state that my system is simple, rugged, convenient and inexpensive, as will be understood from the following description and drawings, in which Fig. 1 shows my system, taken as a whole, this figure being largely diagrammatic but showing the fundamental mechanical and electrical relations of the several mechanisms indicated. Fig. 2 shows a side elevation of a practical embodiment of a portion of my system, being that mechanism utilizable at any point to derive pointer indications of the shaft revolutions. A portion of the case has been broken away. Fig. 2a shows, partly in section, a detail of the mechanism of Fig. 2 and more particularly a portion of the positioning mechanism. The section of Fig. 2a is taken along the section line 2a—2a in Fig. 2. Fig. 3 is a front elevation of the mechanism of Fig. 2, but with parts of the cover, the dial and dial support plate broken away. Fig. 4 shows in semidiagrammatic form some electrical and mechanical details of the control device, 123 of Fig. 1. Fig. 4a shows the electrical connections for the repeater 72a of Fig. 1 and the exciting coil of the motor 129; and Fig. 4b electrical connections to the synchronous motor 82. Figs. 5, 6 and 7 show respectively a plan, a side view in partial section and a sectional view on the section line 7—7 Fig. 5 of the contact making mechanism and control details constituting an operating device adapted to take the part of the symbolic control part 123 of Fig. 1. The portion sectioned in Fig. 6 is cut along the line 7a—7a, Fig. 5.

I show in Fig. 1, means for giving a continuous, visible indication of the shaft speed representing the propeller.

I provide at my indicating mechanism, means, 72a, for reproducing in a shaft, proportionally, the speed to be measured, as for example, a self synchronous repeater operated in any suitable manner from the propeller shaft. This repeater is shown symbolically, the three-part windings being indicated by the lines 1a, 1b and 1c, and the leads of the single phase exciting circuit by the conductors d and e. The armature in which the rotation is developed is represented by the central part of the symbol, connected with the shaft 124.

At 14, Fig. 1, I show a symbol indicating a normal single phase supply for exciting the repeater 72a, for supplying the motor 129 and any other purpose. In Figs. 1, 4, 4a and 4b, I show electrical conductors in the usual manner by single lines and where two or more such conductors are conveniently cabled into a single sheaf, I show this also as a single line. In the interest of clearness, I mark the sheaf with its own reference character and also with its own reference character, any conductor tapped into such a cable. The cable carrying the single phase conductors d and e to the repeater 72a and to the leads of the motor 129 is shown at 1k. The repeater, 72a, drives a shaft, 124, and thus a bevel gear, 120, through a gear and pinion, 300, the gear being mounted on its back as shown. The companion bevel gear, 119, is driven through a spur gear, 126, mounted on its back, by a sliding pinion, 301. The operation provides for the bevel gear, 119, to be driven automatically at the speed of the bevel gear, 120, the former being made to change its speed from time to time as the speed of the latter may change, according to variations of the propeller speed, there being provided means for indicating by a pointer on a dial the changes thus made necessary in the speed of the gear, 119, this pointer showing, with proper markings on the dial, the propeller speed.

The means provided for controlling the variations of the speed of the bevel gear, 119, include a constant speed disc, 118, a positioning screw, 128, a riding wheel, 139, carried by a carriage, 127, and driving the sliding pinion, 301, said carriage being under the influence of said screw, electrical contacts at, 123, actuated by the bevel gear, 121, for energizing the positioning motor, 129, and speed indicating means at 140. Further detail of the operation and construction of this apparatus is given under the description of Figs. 2, 2a, 3 and 4.

In Fig. 1, I show the apparatus, 13, for deriving constant frequency alternating current, for the purpose of driving the disc, 118 at closely constant speed. The conductors carrying the constant frequency, alternating current are identified as 8a and 8b and where they are in a cable, it is marked 8k.

This device consists of a normal alternating generator, 13a, driven by a prime mover, 13b, having the characteristic of maintaining a strictly constant speed. This prime mover may be any one of several well known types or may be of special design.

In Figs. 2, 2a, 3, 4, 4a, 4b, 5, 6 and 7, I show the mechanism for operating the speed indicating instrument, shown in Fig. 1. P is the frame or case of the instrument, made splash tight by gaskets, G, G. The indications of the speed of the engine shaft from which the indicator is driven is shown by the pointer, 142, which sweeps over the dial, 153, graduated preferably in revolutions per minute. The pointer, 142, has a relatively extended travel, as here shown passing six times around the dial, between zero and full speed, while the pointer, 143, travelling at one sixth the speed passes once around the dial and serves to indicate how many complete revolutions the pointer, 142, has made, the two pointers being geared together by a train of gears, 150, much like the hands of a clock.

The bevel gear, 120, is driven by the repeater, 72a, through the helical gears, 144, spur gears being shown for this purpose as a matter of convenience, in the illustration of Fig. 1. The gear 120, and the helical gear are carried loosely on the shaft, 145, of the spider, 122, which carries the bevel pinion, 121, the shaft being mounted in brackets carried on the frame, P. The bevel gear, 119, is also loose on the shaft, 145, and is driven by the sliding pinion, 301, through the gear, 126, as shown in detail in Fig. 2a. This pinion is fast on the shaft of the riding wheel, 139, both the wheel and the pinion being fast thereon. The shaft is carried in ball bearings housed in the two arms of a carriage, 127. In order that there may be no error in the indications of the pointer, 142, due to backlash in these bearings or in the play of the wheel, 139, I introduce a flat plate type spring, 147, between the upper bearing, 146, and the housing on the up side, urging the wheel, 139, always in one direction.

The purpose of the constant speed disc, 118, and the riding wheel, 139, is to provide a convenient means for adjusting the speed of the bevel gear, 119, to that of the bevel gear, 120, this being accomplished by moving the wheel, 139, along the radius of the disc, 118; the speed of the wheel, 139, being proportional to its distance from the center of rotation of the disc, 118.

The wheel positioning screw, 128, is threaded over its lower portion to move the carriage, 127, from the lower to the upper position. The upper end of the screw carries a helical pinion, 148, driving a helical gear, 149, fast on the shaft of the pointer, 142. This shaft is carried in bearings in suitable supporting plates. To prevent backlash between the carriage, 127, and the screw, 128, from introducing an error, I use a spring, 304, urging the carriage downward. Here and in the case of the spring, 147, gravity works in the same direction as the spring, which may in some cases be omitted. To preserve the carriage, 127, in the proper position before the disc, 118, I provide a guide rod, 151, cooperating with a roller, 305, on the carriage, a pressure being maintained between them by a flat plate type spring 306, behind the gear of the shaft of the disc, 118, and pushing it against the riding wheel, 139, thus securing proper driving contact and preventing slipping of the wheel on the disc. The disc, 118, is driven at a constant speed by the synchronous motor, 82, through the train of gears, 82b, the motor, 82, being energized from the constant frequency source, 13, through the wires, 8a and 8b, Fig. 4b.

The screw, 128, is driven by a small alternating current motor, 129, mounted on the frame near the bottom.

As this motor is high speed relatively to the screw, I provide a reducing gear train, 152. This motor, 129, operates intermittently in opposite directions as may be necessary to properly position the screw and wheel, 139, and receives its control impulses from the action of the contacts at 123, as will be explained, the motor being continuously excited from a source of single-phase current which may be the same as that supplied to the transmitters and repeaters from the wires, d and e. As it is desirable that the adjustments of the position of the wheel, 139, shall be made slowly for slow minor variations of the engine speed and more quickly with rapid or wide variations, I use a special arrangement of contacts, 123, described in connection with Figs. 5, 6 and 7. Furthermore, to prevent over shooting of the point of equilibrium when wide adjustments are made, I may use a friction wheel drive by which the control contacts at 123, are separated slightly ahead of the time the true wheel position is reached, so that the drift of the motor, 129, will not carry the carriage, 127, too far. In addition to these adjustments, as a sudden speed adjustment may call for an extensive travel of the pinion, 121, and the wheel, 307, with its shaft, 145, I construct the supports for the "fixed" contacts at 123, in such a way that they may slide against a small friction when the motion of the "movable" contacts is excessive.

These expedients are carried out as follows: The contacts, 161 and 163, Figs. 5, 6 and 7, are carried on a wheel, 307, fast on the shaft, 145, these contacts being connected respectively to the outer terminals of the shading coils, 308, and 309, in Fig. 4, the inner terminals being connected together and grounded at 130, Fig. 4, on the frame of the motor, 129. The arm, 310, carried on a shaft, 311, coaxial with the shaft, 145, is provided on one end with a set of three contacts, 312, 162 and 313, Figs. 5, 6 and 7, the first and last being electrically connected together and cooperating respectively with the contacts, 161 and 163. The contact, 162, is mounted on a stiff member and is electrically grounded at 130, in any convenient manner. The contacts, 312 and 313, are mounted on flexible members and have an electrical connection to one end of the resistance, 314, which in turn is connected at the other end to the ground, 130, of the contact, 162. The resistance, 314, is mounted on the other end of the arm, 310, from the contacts and the current passes to the ground through the spring plate, 315, which serves to provide the opportunity for slippage between the "fixed" contacts and their mounting described above, the arm, 310, slipping on the shaft, 311. To prevent the overshooting of the adjustment of the wheel, 139, I drive the shaft, 311, at a very slow speed by friction or other convenient means from the shaft of the positioning screw, 128, by a spindle, 316, which is an extension thereof and runs on the outer edge of the friction drive wheel, 317, the speed of this wheel being still further reduced by the spindle, 318, carried by the shaft, 319, of the wheel, 317, and the friction drive wheel, 320, which is fast on the shaft, 311.

The operation of this contact control is as follows. Starting with a condition of equilibrium, any increase of speed of the engine shaft will cause a corresponding increase in the speed of the bevel gear, 120, and a rotation of the spider of the bevel pinion, 121, and the shaft, 145, at a rate half of the difference in the speeds of the bevel gears, 119 and 120. With this movement of the shaft, 145, the contact, 312, will leave its connection with the contact, 161, which is the equilibrium position of this contact, but contact, 313, will remain in contact with contact, 163, which is also its equilibrium position, the net result being that the circuit of the shading coil, 308, will be opened and the motor, 129, will run in such a direction as to raise the position of the wheel, 139, on the disc, 118, and thus increase the speed of the bevel gear, 119, tending toward the equilibrium position. However, the current in the shading coil, 309, must pass through the resistance, 314, Fig. 4, and hence the speed of the motor will be cut down and the adjustment be relatively slow. If the increase of engine speed is slow, the point of equilibrium will be reached without greater effort on the part of the motor, 129. However, the screw, 128, during this adjustment is slowly driving the shaft, 311, forward away from the contact, 163, through the action of the friction drive wheels, 320 and 317, so that as the difference in speed between the gear, 119, and the gear, 120, gets less and less there will come a time when the contact, 163, will fall behind the contact, 313, and the contact, 312, will catch up with the contact, 161, reestablishing the circuit at this point. See Fig. 4. At this moment the motor, 129, loses its driving torque and the current through the two shading coils will act as a brake and stop it quickly. On account of the movement of the shaft, 311, the closing of contacts, 161 and 312, will be made just before the position of equilibrium has been reached and if the parts are properly adjusted, as may be done by trial, the momentum of the motor, 129, will carry the wheel, 139, to the point of equilibrium and no further adjustment is necessary. If not, the apparatus proceeds to adjust the speeds as before until equilibrium is attained.

If now the speed change is broad and sudden, not only will the contact between 161 and 312 be broken, but the wheel, 307, will proceed further and close the contacts, 313 and 162, in which case, as the support of the contact, 162, is rigid, any further movement of the wheel, 307, with regard to the "fixed" contacts will cause the shaft, 311, to slip with regard to the arm, 310. Meanwhile the contact between, 313 and 162, short circuits the resistance, 314, and the motor, 129, operates at an increased speed, thus hastening the adjusting action.

The operation of correction of wheel position is the same with a decrease of engine speed, as will be understood, but in this case the direction of rotation of the wheel, 307, is in the opposite direction and the functions of the contacts are correspondingly interchanged. Collector rings and brushes for the wheel, 307, are shown at 321. The motor, 129, illustrated in Figs. 2, 3 and 4, is an induction motor, excited by a magnetizing coil, 157, the two shading coils, 308 and 309 being oppositely wound on two half poles of the stator. This motor is of well known operation and needs no further explanation. The motor is excited through the leads, $d$ and $e$, Fig. 4a.

The electrical connections may be further described in connection with Figs. 4, 4a and 4b in which the transmissions are shown at $1k$ and $8k$. The connections to the repeater 72a, including the 3-part winding, 159, and the single phase exciting winding, 158, are grouped in the cable $1k$, and are shown at $1a$, $1b$, $1c$ and $d$ and $e$, in Fig. 4a. The connections from the constant frequency source, 13, are shown at $8a$ and $8b$, Fig. 4b leading to the synchronous motor, 82. The primary winding, 157, of the motor, 129, is supplied by the leads $d$ and $e$, Fig. 4a. This primary winding induces voltages in the two shading coils, 308 and 309, which voltages serve to cause the necessary currents to flow in the contacting device, 123.

While I have described my invention as supplied to a ship's propeller, it may be used equally well for a great variety of other purposes, as may be appropriate.

I claim as my invention:

1. A speed indicator, comprising two differentially connected elements and a differential rider, one of said differentially connected elements being driven at the speed to be indicated, means for driving the other element, including a friction disc and riding wheel, independently energized and connected thereto, separate positioning means for moving said wheel on said disc, an additional power driven actuating device for driving said positioning means and control means for said actuating device, responding to a difference in the speeds of said differentially connected elements acting through said differential rider together with means for deenergizing said actuating device, when said difference in speeds approaches zero.

2. A speed indicator, comprising two differentially connected elements and a differential rider, one of said differentially connected elements being driven at the speed to be indicated, means for driving the other element, including a friction disc and riding wheel, independently energized and connected thereto, separate positioning means for moving said wheel on said disc, an additional power driven actuating device for driving said positioning means and control means for said actuating device, responding to differences in the speeds of said differentially connected elements acting through said differential rider together with additional means also responsive to the differential rider and included in said control means, for changing the natural rate of movement of said positioning means according to the extent and the suddenness of changes in said differences in speeds.

3. A speed indicator comprising a shaft driven at a speed having a fixed proportionality to the speed to be measured, a constant speed disc and friction riding roller driven thereby, adjusting means for varying the driving ratio between said constant speed disc and said driven roller, control means sensitive to differences in speed between said roller and said shaft, actuating means responsive to said control means to automatically reduce said differences in speed by acting on said adjusting means, means operating upon said control means for deenergizing said actuating means, in advance of reaching the position of speed balance by said control means, together with visible means for indicating the value of the aforesaid driving ratio and hence the speed to be measured.

4. In the type of shaft revolutions indicator adapted to utilize a radially moving roller on a constant speed friction disk to control the speed of an auxiliary reference shaft, supervisory control and indicating means including the combination of an electric motor, and supply therefor, a pointer and a dial, means connecting said motor for positioning said roller and means connecting said motor for relatively positioning said pointer and dial, whereby the roller and the pointer are simultaneously moved by the operation of the motor and electrical means actuated by a difference in speed between said auxiliary shaft and the shaft whose speed is to be measured, for connecting said motor to its supply in a manner to cause its motion to speed up the auxiliary shaft when the speed of this shaft is the slower and to retard the auxiliary shaft when its speed is the higher in combination with means for deenergizing said electrical means as said difference in speed approaches zero, whereby over-running by said motor is prevented.

5. In a mechanism in which an electric contactor is utilized to control the relative speed of two revolving shafts, a speed adjusting mechanism, comprising a reversible electric motor, characterized by two coils connected together at one end, the exciting of one causing forward rotation of the motor and of the other backward rotation, and the exciting of both having no tendency to rotate the motor in either direction but causing a retarding force, mechanical connections between said motor and one of said shafts to raise the speed on a forward motion of the motor and to lower it on a backward movement, a 5 point contact device with a forward and a backward contact on opposite sides of 3 central contacts, the outer two being flexibly mounted on the same base, separate electrical connections from said forward contact to the forward coil of the motor and from said backward contact to the backward coil of the motor, an electric source, an electrical connection between the outer two of the three central contacts and a connection therefrom to the said motor coils, a resistor in said connection, and an electrical connection from the third of the central contacts to said connection, shunting out said resistance, together with means responsive to a fall in speed of said last named shaft for moving said forward and said backward contacts in a direction to cause the forward contact to cooperate with the adjacent contact of the central group and to cause the backward contact to break contact with its adjacent contact and upon further motion to close contact between both contacts on the forward side against the central one of the three contacts, and for moving the same forward and backward contacts in the opposite direction on a rise in speed of said element to cause the backward contact to cooperate with the central contacts and the forward to separate therefrom and on further motion to close both contacts on the backward side against the central, leaving the forward and backward contacts only in contact with the adjacent inner contacts in the neutral position, whereby both motor coils are excited and the motor is damped to rest.

6. In an indicating instrument incorporating an element to be positioned whose overtravel is to be controlled, the combination of an electric positioning motor whose natural over-travel is to be controlled, a rotating element affected by movement of said motor acting as a master control, a second rotatable element, means for driving said second element from said master control, electrical means for making use of the driving means to energize said motor and additional means for deenergizing said electrical means in anticipation of the stopping of the rotation of said first named rotating element, when the duty of said positioning motor is done.

FRANCIS L. CORBIN.